United States Patent [19]
Logsdon

[11] Patent Number: 5,862,355
[45] Date of Patent: Jan. 19, 1999

[54] METHOD AND APPARATUS FOR OVERRIDING BUS PRIORITIZATION SCHEME

[75] Inventor: Brian D. Logsdon, Akron, Ohio

[73] Assignee: Telxon Corporation, Akron, Ohio

[21] Appl. No.: 713,216

[22] Filed: Sep. 12, 1996

[51] Int. Cl.[6] .................................................. G06F 13/36
[52] U.S. Cl. .......................................................... 395/296
[58] Field of Search .................................. 395/296, 303, 395/861, 732, 737, 673; 711/151

[56] References Cited

U.S. PATENT DOCUMENTS

| | | | |
|---|---|---|---|
| 4,829,467 | 5/1989 | Ogata | 395/732 |
| 5,151,994 | 9/1992 | Wille et al. | 395/296 |
| 5,274,774 | 12/1993 | Manber et al. | 395/305 |
| 5,396,602 | 3/1995 | Amini et al. | 395/293 |
| 5,440,698 | 8/1995 | Sindhu et al. | 395/200.55 |
| 5,440,752 | 8/1995 | Lentz et al. | 395/303 |
| 5,546,548 | 8/1996 | Chen et al. | 395/296 |
| 5,572,686 | 11/1996 | Nunziata et al. | 395/296 |
| 5,644,733 | 7/1997 | Kalish et al. | 395/293 |

Primary Examiner—Meng-Ai T. An
Assistant Examiner—Sumati Lefkowitz
Attorney, Agent, or Firm—Renner, Otto, Boisselle & Sklar, P.L.L.

[57] ABSTRACT

A bus arbiter circuit for a system including a bus and a plurality of devices which can request access to the bus at various times. The bus arbiter circuit includes circuitry for receiving requests for access to the bus from those of the plurality of devices desiring access to the bus during an arbitration cycle; circuitry for arbitrating access to the bus during the arbitration cycle in response to the received requests, an outcome of the arbitration cycle being based on a corresponding priority level associated with each of the plurality of devices; circuitry for granting access to one of those devices requesting access to the bus based on the outcome of the arbitration cycle; and circuitry for increasing the corresponding priority level associated with those of the plurality of devices which requested access to the bus but which were not granted access to the bus as a result of the arbitration cycle.

20 Claims, 11 Drawing Sheets

METHOD AND APPARATUS FOR OVERRIDING BUS PRIORITIZATION SCHEME

TECHNICAL FIELD

The present invention relates generally to a bus arbiter circuit and method for arbitrating access to a bus among a plurality of devices. More specifically, the invention relates to a bus arbiter circuit and method which includes overriding a preset priority level associated with a device requesting the bus in the event the device continues not to receive access to the bus.

BACKGROUND OF THE INVENTION

As electronic devices such as personal computers, lap top computers, video cameras, hand-held data readers and other similar devices become increasingly complex, the amount of information which must be internally communicated among components has also significantly increased. For example, disk drive controllers, such as SCSI controllers, network interface cards (NICs), display controllers, and video graphic boards all must communicate with a host processor which acts as a central controller for the particular electronic device. Each component, or peripheral device, attempts to send information to a local bus associated with the host processor in order to communicate its messages. To handle the large number of peripheral devices, standard bus configurations have been developed to interface the peripheral devices with the local bus. An arbitration scheme is then used to prioritize which peripheral device should have access to the standard bus (i.e. be the bus master) at any given time so that data collisions between two or more peripheral devices attempting to communicate with the host processor are avoided.

The arbitration scheme is typically handled by an arbiter whose function is to receive bus request signals from devices wishing to communicate over the standard bus and then schedule when each device will gain such access. For example, one commonly known bus configuration to which peripheral devices would directly connect is the ISA bus. The ISA bus design allows an arbiter to use a Direct Memory Accessing (DMA) scheme to process and prioritize requests to use the ISA bus. The ISA bus, however, is limited in its ability to transfer high density data at fast rates and therefore new standard bus configurations are being developed.

Among the more popular of the newer standard bus configurations is the Peripheral Component Interconnect (PCI) bus. The PCI bus has many advantageous over the ISA bus in its ability to communicate data at a significantly faster rate. However, based on its design, the PCI bus no longer allows the associated bus arbiter to use a DMA scheme in prioritizing bus requests and therefore hardware prioritization schemes are being developed. For instance, some PCI bus arbiters are designed to give lowest priority to those devices which most recently requested and received permission to communicate over the PCI bus. However, as is pointed out in U.S. Pat. No. 5,471,590, this prioritization scheme has drawbacks in situations where a particular device has gained access to the bus and the host processor but needs to retry its communication due to some mishap. More specifically, although the original device was of high enough priority to gain access to the bus and host processor, the arbiter would automatically re-assign a low priority to this device even though the message never was properly passed along and processed.

The arbitration scheme described in the aforementioned U.S. Pat. No. 5,471,590 describes a system which reduces this problem by providing an arbiter which does not change the priority level of devices which must retry. Although this may be an improvement over known arbitration schemes, both of these schemes still have major drawbacks. More particularly, since devices cannot ever increase from their preset priority value, those devices with low priority may rarely have an opportunity to access the bus in a busy system. Unfortunately, even with a low initial priority rating such devices do eventually need access to the bus to avoid buffer overflow situations and other similar problems.

In view of the aforementioned shortcomings associated with conventional arbiters and arbitration methods, there is a strong need in the art for an arbiter and method which prioritizes access to a bus taking into account the concerns discussed above. In particular, there is a strong need in the art for an arbiter and method which better allocates bus access such that all devices may receive the bus regardless of their preset priority level or the amount of traffic in the system.

SUMMARY OF THE INVENTION

The bus arbiter and method of the present invention reprioritizes a device requesting access to the bus when such a device is denied access or is otherwise passed over in favor of another device. Consequently, a device which is repeatedly denied access to the bus will have its priority level automatically upgraded in order that the device will eventually be granted access to the bus. At the same time, however, the priority level of the device does not fall below a preset priority level. Accordingly, even if a device does not successfully complete transmission on the bus due to a communication mishap or the like, the device maintains at least its preset priority level.

In a preferred embodiment, each device connects to the arbiter in, for example, one of N arbiter I/O ports. The arbiter is configured such that a device connected to I/O port "0" is generally at a higher priority level than a device connected to I/O port "1". At the same time, the device connected to I/O port "1" has a higher priority level than the device connected to I/O port "2", etc. The arbiter also includes a different priority register associated with each I/O port. Each priority register has stored therein a preset priority level selected from among a plurality of different priority levels, e.g., panic, high, middle, and low. For a given device, the setting in the corresponding priority register takes precedence over the I/O port number to which a device is connected. However, in the event two or more devices requesting access to the bus have the same priority register setting, the I/O port location is used as the tie breaker as will be appreciated.

In order to ensure that all devices eventually get access to the bus regardless of the device's originally preset priority register, the present invention further includes within the arbiter a deny register and a deny counter for each I/O port. The deny register stores a preset number, which represents the number of times a device can be denied access to the bus prior to the device being reprioritized to a panic priority level. The deny counter is incremented each time a device has a request to access the bus pending but the arbiter grants access to another device. When the contents of the deny counter equals the number in the deny register, the priority level of the device is set to a panic level. Thus, even a device with a relatively low preset priority level can eventually be upgraded to a panic priority level and likely gain bus access. Upon finally gaining access to the bus, the deny counter is cleared. Using this procedure, each device can eventually gain bus access. Further, devices which are granted access to the bus but must "retry" due to a transmission failure or the like are not automatically bumped to a low priority level as was done in some conventional systems.

According to one particular aspect of the invention, a bus arbiter circuit is provided for a system including a bus and a plurality of devices which can request access to the bus at various times, each of the devices being configured to provide a bus request signal to the bus arbiter circuit when requesting access to the bus and to receive a bus grant signal from the bus arbiter circuit when granted access to the bus. The bus arbiter circuit includes circuitry for arbitrating access to the bus during an arbitration cycle in response to bus request signals from those of the plurality of devices requesting access, an outcome of the arbitration cycle being based on a corresponding priority level associated with each of the plurality of devices; circuitry for granting access, via a respective bus grant signal, to one of those devices requesting access to the bus based on the outcome of the arbitration cycle; and circuitry for increasing the corresponding priority level associated with those of the plurality of devices which requested access to the bus but which were not granted access to the bus as a result of the arbitration cycle.

In accordance with another aspect of the invention, a bus arbiter circuit is provided for a system including a bus and a plurality of devices which can request access to the bus at various times. The bus arbiter circuit includes circuitry for receiving requests for access to the bus from those of the plurality of devices desiring access to the bus during an arbitration cycle; circuitry for arbitrating access to the bus during the arbitration cycle in response to the received requests, an outcome of the arbitration cycle being based on a corresponding priority level associated with each of the plurality of devices; circuitry for granting access to one of those devices requesting access to the bus based on the outcome of the arbitration cycle; and circuitry for increasing the corresponding priority level associated with those of the plurality of devices which requested access to the bus but which were not granted access to the bus as a result of the arbitration cycle.

According to still another aspect of the invention, a method of bus arbitration is provided for a system including a bus and a plurality of devices which can request access to the bus at various times. The method includes the steps of receiving requests for access to the bus from those of the plurality of devices desiring access to the bus during an arbitration cycle; arbitrating access to the bus during the arbitration cycle in response to the received requests, an outcome of the arbitration cycle being based on a corresponding priority level associated with each of the plurality of devices; granting access to one of those devices requesting access to the bus based on the outcome of the arbitration cycle; and increasing the corresponding priority level associated with those of the plurality of devices which requested access to the bus but which were not granted access to the bus as a result of the arbitration cycle.

In accordance with still yet another aspect of the invention, a bus arbiter circuit is provided for a system including a bus and a plurality of devices which can request access to the bus at various times, each of the devices being configured to provide a bus request signal to the bus arbiter circuit when requesting access to the bus and to receive a bus grant signal from the bus arbiter circuit when granted access to the bus, and at least one of the devices being configured to provide a hardware panic signal to the bus arbiter circuit indicative of the at least one device desiring increased priority, the bus arbiter circuit comprising: circuitry for arbitrating access to the bus during an arbitration cycle in response to bus request signals from those of the plurality of devices requesting access, an outcome of the arbitration cycle being based on a corresponding priority level associated with each of the plurality of devices; circuitry for granting access, via a respective bus grant signal, to one of those devices requesting access to the bus based on the outcome of the arbitration cycle; and circuitry for increasing the corresponding priority level associated with the at least one device in response to receiving the hardware panic signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
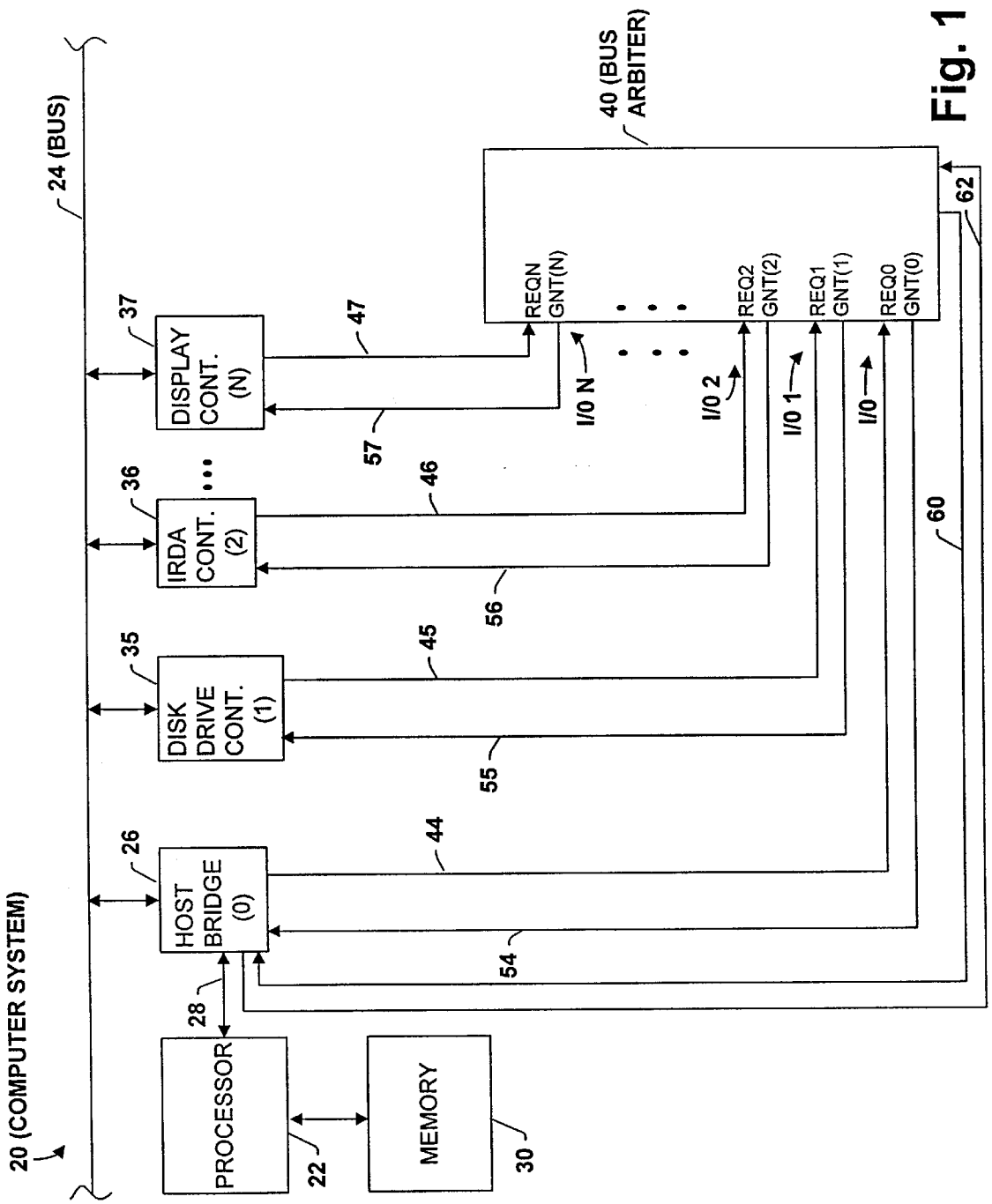
FIG. 1 is a block diagram of a computer system including a bus arbiter circuit in accordance with the present invention.

The present invention will now be described with reference to the drawings, wherein like reference numerals are used to refer to like elements throughout. Referring initially to FIG. 1, there is shown a computer system 20 which includes a host processor 22 coupled to a system bus 24 through a host bridge 26. In the exemplary embodiment, the bus 24 is a PCI type bus. The host bridge 26 is of conventional design for converting communications over the PCI bus 24 into a format which can be passed over a local bus 28 between the processor 22 and the host bridge 26. Although the present invention is particularly useful for use with a PCI bus, it will be appreciated that the present invention has application with other bus configurations such as an ISA or EISA bus. Accordingly, the scope of the present invention is not intended to be limited necessarily to any particular bus. Also coupled to the processor 22 is memory 30 which includes, for example, both RAM and ROM for storing operating software, data, etc.

The system 20 also includes a plurality of conventional peripheral devices 35–37 connected to the bus 24. The peripheral devices are configured to communicate with the processor 22 via the bus 24 and host bridge 26 according to conventional techniques. Furthermore, the system 20 includes a bus arbiter circuit 40 for arbitrating access to the bus 24 among the devices 35–37 and the host bridge 26. As will be discussed in more detail below, each of the devices 35–37 and the host bridge 26 is configured to assert a bus request signal which is provided to the bus arbiter circuit 40 when desiring to access the bus 24. In accordance with the present invention, the bus arbiter circuit 40 determines which device is to be granted access to the bus 24 based on a prioritization scheme described herein. The bus arbiter circuit 40 in turn asserts a bus grant signal to the selected device based on the outcome of the arbitration indicating that the device has been granted access to the bus 24 to the exclusion of the other devices.

In the exemplary embodiment, the peripheral devices 35–37 include a disk drive controller 35, an IRDA controller 36 and a display controller 37. It will be appreciated, however, that various other devices such as an optical interface, etc., could be utilized in addition and/or in place of the exemplary devices. The preferred embodiment is described as including N different devices (including the host bridge 26) coupled to the bus 24, where N can be any integer number greater than or equal to two (e.g., eight).

The bus arbiter circuit 40 includes N I/O ports for handling up to N different devices. The host bridge 26 and each device 35–37 connects to a respective I/O port (0) through (N) via respective bus request lines 44–47 and bus grant lines 54–57. For example, the bus request line 44 of the host bridge 26 is connected to the REQ0 input of the bus arbiter circuit 40, and the bus grant line 54 is connected to the GNT(0) output; the bus request line 45 of device 35 is connected to the REQ1 input of the bus arbiter circuit 40 and the bus grant line 55 is connected to the GNT(1) output of the arbiter circuit 40; etc. The devices 35–37 are configured to assert a bus request signal on their respective bus request lines 45–47 when desiring access to the bus 24. Similarly, the devices 35–37 are configured to receive a bus grant signal from the bus arbiter circuit 40 on their respective bus grant lines 55–57 when granted access to the bus 24. The host bridge 26 is configured, as is conventional, to assert a bus request signal on bus request line 44 in response to a request by the processor 22 to access the bus 24. Similarly, the host bridge 26 is designed to receive a bus grant signal on line 54 when the arbiter circuit 40 grants the processor 22 access to the bus 24 via the host bridge 26.

As is discussed in more detail below, each of the I/O ports of the bus arbiter circuit 40 (e.g., REQ0 & GNT(0), REQ1 & GNT(1), etc.) has associated therewith a preset priority level. More specifically, the I/O port corresponding to REQ0 & GNT(0) is given the highest preset priority, the I/O port corresponding to REQ1 & GNT(1) has the next highest preset priority, and so on. Consequently, the I/O port corresponding to REQN & GNT(N) is given the lowest preset priority. Thus, the host bridge 26 and each of the devices 35–37 has a preset priority level by virtue of the particular I/O port to which it is connected in the bus arbiter circuit 40. At the same time, however, the host bridge 26 and each of the devices 35–37 has an additional preset priority level associated specifically therewith which takes precedence over the priority based on the particular I/O port. This additional preset priority can be any of multiple priority levels such as "low", "mid", "high" and "panic" levels. Again as is discussed more fully below, this additional preset priority level of the host bridge 26 and each device 35–37 is increased in those situations where the host bridge 26 of the particular device 35–37 has requested but not received the bus 24 after a corresponding predetermined number of times. As a result, even a device with a relatively low priority level will eventually receive access to the bus 24.

Upon receiving one or more bus request signals via lines 44–47, the bus arbiter circuit 40 checks initially to see if the host processor 22 is ready to receive communications. Specifically, the bus arbiter circuit 40 sends a host request signal to the processor 22 via a host request line 60 and the host bridge 26. The bus arbiter circuit 40 then waits until it receives a host ready signal from the processor 22 via the host bridge 26 and a host ready line 62 indicating that the bus 24 is available and the processor 22 is ready to receive communications. While waiting for a host ready signal on line 62, the bus arbiter circuit 40 determines which of the devices 26 and 35–37 asserting a bus request signal on lines 44–47 has the highest priority as determined based on the discussion below. Based on which device has the highest priority, the bus arbiter circuit 40 issues a bus grant signal on the corresponding one of the bus grant lines 54–57. In turn, the host bridge 26 or device 35–37 which is thereby granted access takes control of the bus and carries out its desired communications.

Figure 2:
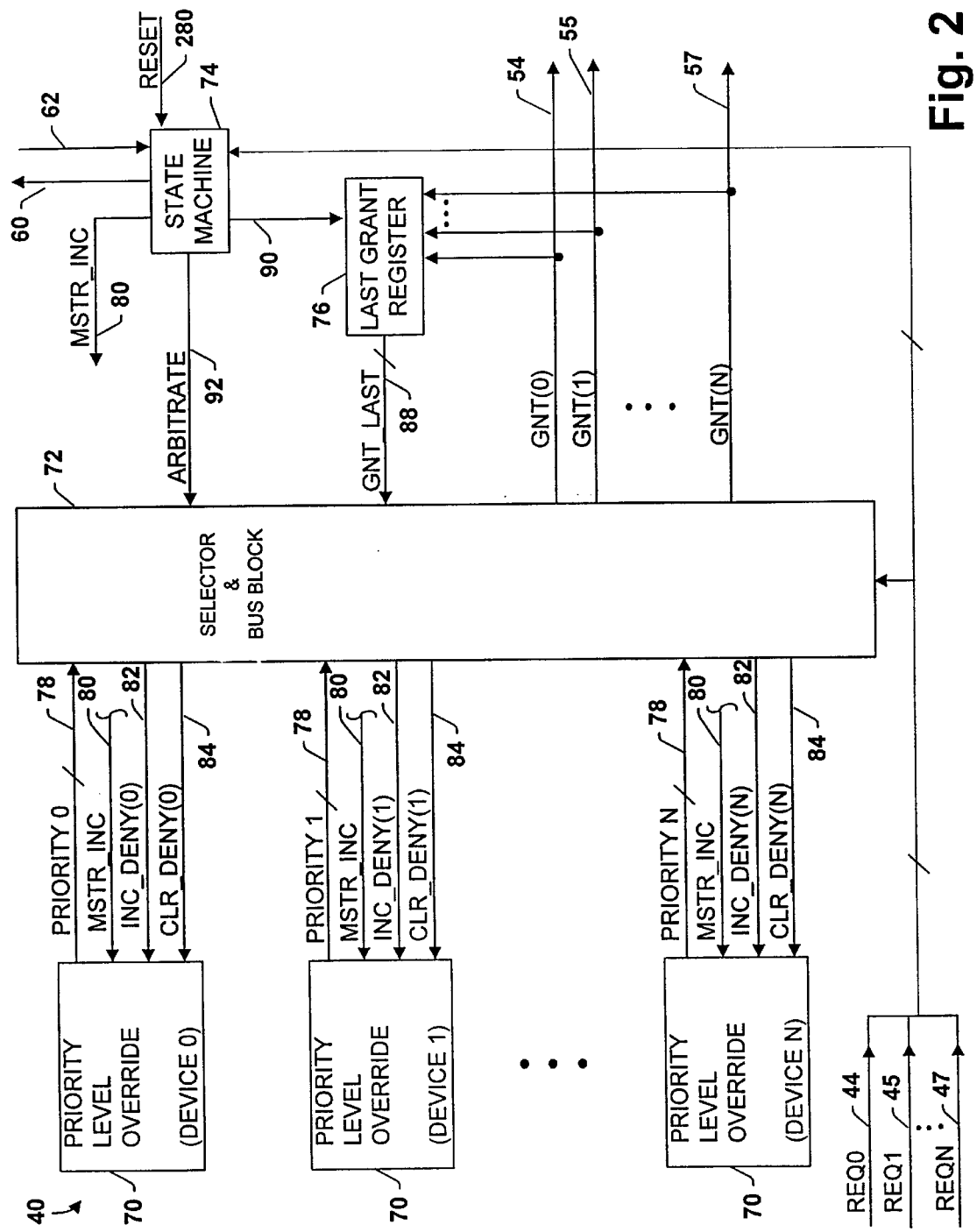
FIG. 2 is a block diagram of a bus arbiter circuit in accordance with the present invention.
Figure 3:
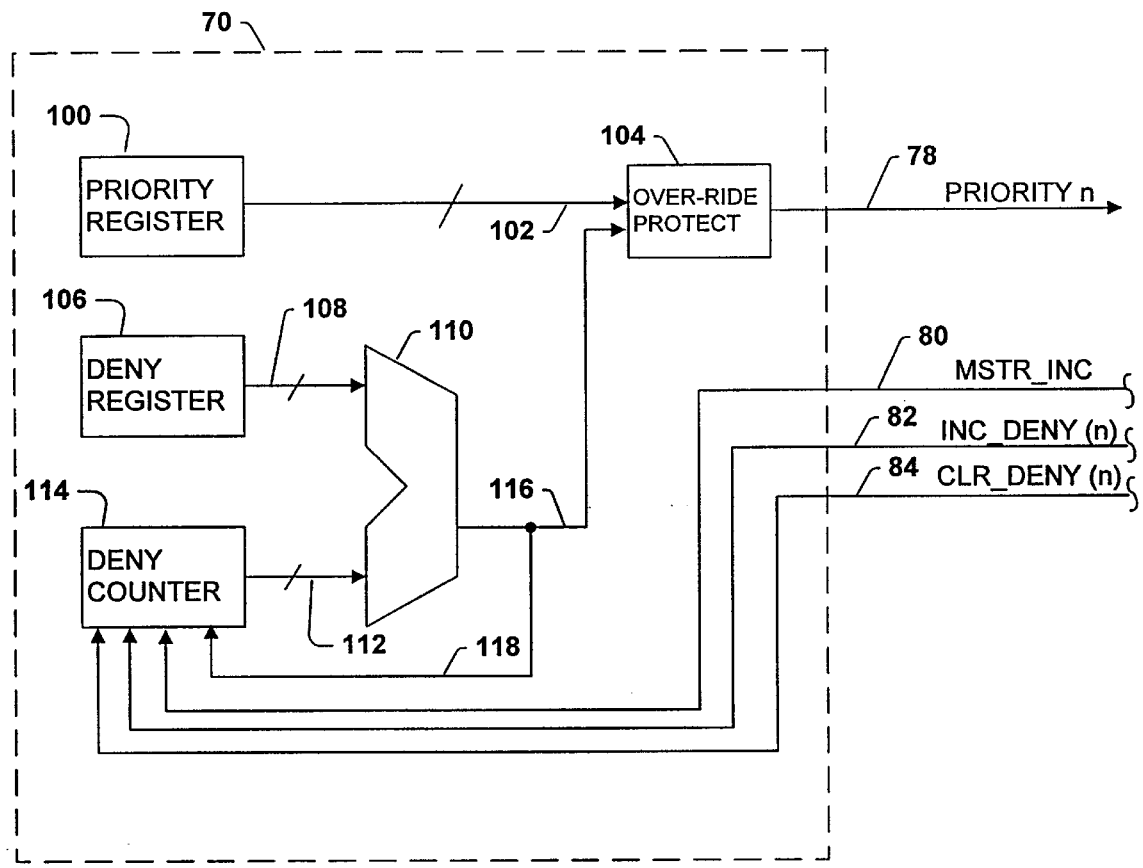
FIG. 3 is a detailed block diagram of a priority level override circuit within the bus arbiter circuit in accordance with the present invention.

Referring now to FIG. 2, a detailed block diagram of the bus arbiter circuit 40 is shown. The bus arbiter circuit 40 includes N priority level override circuits 70 with one corresponding to each I/O port. The priority level override circuits 70, described in more detail with respect to FIG. 3, are coupled to a selector and bus block circuit 72 containing logic gates for ascertaining which particular device 35–37 requesting the bus 24 has the highest priority. The selector and bus block circuit 72 is described in more detail below in relation to FIGS. 4–8. Also included in the bus arbiter circuit 40 is a state machine 74 for providing the appropriate timing and control signals within the bus arbiter circuit 40. Finally, the bus arbiter circuit 40 includes a last grant register 76 used for storing the identity of the device which had been previously granted access to the bus 24 as discussed more fully below. As is shown in FIG. 2, the bus request lines 44–47 from the respective devices 26 and 35–37 are input to the selector and bus block 72 and the state machine 74. The bus grant lines 54–57 are output to the respective devices 26 and 35–37 from the selector and bus block 72.

Each priority override circuit 70 provides a corresponding PRIORITYn signal (where n=0 to N) on line 78 to the selector and bus block circuit 72. As is discussed below in relation to FIG. 3, the PRIORITYn signal is indicative of the priority level assigned to the particular device at the time. In addition, each priority override circuit 70 receives a MSTR_INC signal on line 80 from the state machine 74 which serves to enable a deny counter within the respective priority override circuits 70 as is discussed below. The selector and bus block circuit 72 provides each of the priority override circuits 70 with a corresponding INC_DENY(n) signal (where n=0 to N) on line 82 which increments the deny counter each time a corresponding device 26 and 35–37 requests access to the bus 24 but is not granted access during an arbitration cycle. The selector and bus block circuit 72 also provides each priority override circuit 70 with a CLR_DENY(n) signal (where n=0 to N) on line 84 which resets the deny counter upon the corresponding device being granted access as is discussed more fully below.

The last grant register 76 is an N-bit parallel register having its respective inputs coupled to the bus grant lines 54–57. The N-bit output of the last grant register 76 serves as a GNT_LAST signal on line 88 which is input to the selector and bus block circuit 72. The register 76 receives a control signal on line 90 from the state machine 74 after each arbitration cycle which causes the register 76 to store the respective outputs GNT(0) through GNT(N) on the bus grant lines 54–57. Such information is then input to the selector and bus block circuit 72 via line 88 for use in the next arbitration cycle. The state machine 74 also functions to provide an ARBITRATE signal to the selector and bus block circuit 72 on line 92 for each arbitration cycle as discussed below.

FIG. 3 illustrates in detail the priority override circuit 70 in accordance with the present invention. Each priority override circuit 70 includes a two-bit priority register 100 which has stored therein a preset priority level associated with the particular device 26 and 35–37 corresponding thereto. As previously mentioned, in the present embodiment there are four possible levels of priority which include, from highest priority to lowest priority, panic, high, mid, low. Each of these levels can be represented by two-bit data wherein, for example, "11" represents panic, "10" represent high, "01" represent mid, and a "00" represents low. The two-bit data representing the preset priority level associated with a corresponding device 26 and 35–37 is stored in the priority register 100 according to any of various techniques. For example, the bus arbiter circuit 40 may include a set of jumpers or dip switches (not shown) for each I/O port for allowing a user to configure the preset priority levels stored in the respective registers 100 by configuring the position of the jumpers or dip switches. Thus, for example, a user may preset the priority level of device 35 to a "mid" level by storing a "01" in the priority register 100 of the priority override circuit 70 associated with the device. Since it is desirable that the host bridge 26 have relatively high priority in any arbitration cycle, the priority level of the host bridge 26 may be preset to a "high" level by storing a "10" in the priority register 100 of the corresponding priority override circuit 70. The contents of the priority register 100 are output on line 102 as shown to a override protect circuit 104 discussed below.

The priority override circuit 70 also includes a deny register 106. The deny register 106 serves to store a value representative of the number of times the host bridge 26 or device 35–37 associated with the particular circuit 70 and requesting access to the bus 24 can be denied or otherwise not granted the bus 24 prior to the device being upgraded from the preset priority level stored in the priority register 100 to a "panic" level of priority. As with the priority register 100, the deny register 106 has user selectable data stored therein via a set of jumpers or dip switches (not shown), for example. The contents of the deny register 106 are output on line 108 to an input of a digital comparator 110. The other input of the digital comparator 110 is provided on line 112 from the aforementioned deny counter 114 included within the priority override circuit 70. The deny counter 114 functions to keep track of the number of consecutive times the host bridge 26 or device 35–37 associated with the particular priority override circuit 70 and requesting the bus 24 has not received access to the bus 24. The output of the deny counter 114 on line 112 is compared with the value stored in the deny register 106 via the comparator 110.

When the value of the deny counter 114 is equal to the value of the deny register 106, the output of the comparator 110 on line 116 is asserted. The output on line 116 is input to the override protect circuit 104 together with the output from the priority register 100. The override protect circuit 104 is configured such that when the output from the comparator 110 on line 116 is not asserted, the preset priority level stored in the priority register 100 is output as the PRIORITYn signal on line 78. On the other hand, when the value of the deny counter 114 on line 112 is equal to the value of the deny register 108 and the output of the comparator 110 is asserted on line 116, the override protect circuit 104 is configured to output a "panic" priority level of "11" as the PRIORITYn signal on line 78.

In addition to being connected to the override protect circuit 104, the output from the comparator 110 on line 116 is also connected to a disable input of the deny counter 114 via line 11 8. When the output on line 116 is asserted, the deny counter 114 is disabled. Consequently, this avoids the risk of the deny counter 114 overflowing in the event the host bridge 26 or particular device 35–37 does not receive immediate access to the bus 24 despite its priority level being increased to a "panic" level via the override protect circuit 104. The MSTR_INC signal on line 80 serves as a count enable signal which is input to the deny counter 114. When the MSTR_INC signal is asserted during each arbitration cycle, the deny counter 114 may be incremented. The INC_DENY(n) signal on line 82 is input to the deny counter 114 and serves to increment the deny counter 114 during each arbitration cycle in which the host bridge 26 or particular device 35–37 requests the bus 24 but is not granted access to the bus 24. The CLR_DENY(n) signal on line 84 is input to the deny counter 114 and, when asserted, serves to reset the deny counter 114 to zero. Thus, when the host bridge 26 or particular device 35–37 associated with the priority override circuit 70 is granted access to the bus 24, the contents of the deny counter 114 may be reset to zero.

Figure 4:
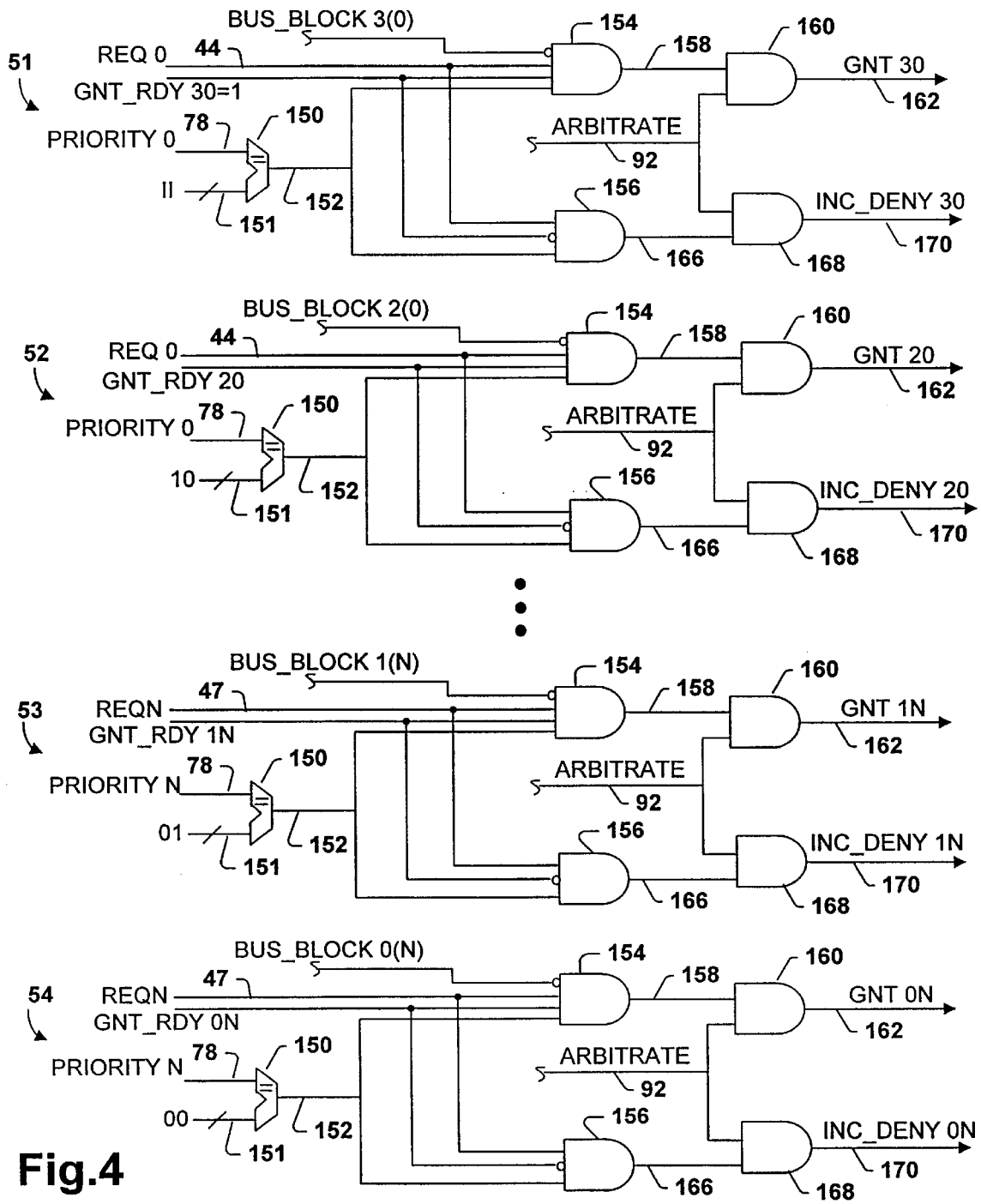
FIG. 4 is a logic diagram of a portion of a selector and bus block section of the bus arbiter circuit in accordance with the present invention, such portion serving to generate a plurality of intermediate bus grant signals and increment deny signals in relation to the corresponding devices in accordance with the present invention.

The selector and bus block circuit 72 includes an array of selector gates as represented in FIG. 4. The array consists of four detection segments S1–S4 for each of the N I/O ports for the possible devices connected to the bus arbiter circuit 40, for a total of 4*N segments so as to cover each possible priority level/device combination. Each segment is responsible for determining whether the device 26 or 35–37 associated therewith has a priority level corresponding to the segment and is requesting access to the bus 24. For example, each of the segments S1 determines whether the device associated therewith is requesting the bus 24 and has a priority level of "11", or "panic". Similarly, each of the segments S2 determines whether the device associated therewith is requesting the bus 24 and has a priority level of "10", or "high". Each of segments S3 and S4, on the other hand, determines whether the device associated therewith is requesting the bus 24 and has a priority level of "01" ("mid") or "00" ("low"). Although only four of the 4*N segments are shown in FIG. 4, it will be appreciated that the remaining segments follow the same sequence and are basically identical with the exception of the inputs and outputs.

FIG. 4 shows segments S1 and S2 in association with the host bridge 26 (REQ0 & GNT(0)), and segments S3 and S4 in association with device 37 (REQN & GNT(N)). Segment S1 includes a digital comparator 150 which receives at one input the PRIORITY0 signal on line 78 from the priority level override circuit 70 associated with the host bridge 26. The other input to the comparator 150 is provided via line 151 with a hardwired or otherwise fixed digital value of "11" corresponding to the "panic" priority level. The comparator 150 is configured so as to assert its output on line 152 as a logic "1" if, and only if, the inputs to the comparator 150 are equal. Hence, the output of the comparator 150 in segment S1 will be a logic "1" only if the PRIORITY0 signal on line 78 corresponds to a "panic" priority level.

The output of the comparator on line 152 serves as an input to a 4-input AND gate 154 and a 3-input AND gate 156. Coupled to an inverted input of the AND gate 154 is a BUS_BLOCK3(0) signal which is provided in accordance with the circuit described below in connection with FIG. 8. The BUS_BLOCK signal, represented generally as BUS_BLOCKP(n) where P corresponds to the decimal equivalent of the binary representation of the preset priority levels for panic, high, mid and low, and n corresponds to the corresponding I/O port for the circuit 40, serves as a means for preventing a device which had access to the bus 24 in the previous arbitration cycle from necessarily receiving access in the current arbitration cycle as is discussed below. As will be appreciated, if the BUS_BLOCKP(n) signal is asserted as a logic "1", the output of the AND gate 154 on line 158 will necessarily be a logic "0". Also connected to an input of the AND gate 154 is the bus request signal REQ0 for the host bridge 26 as provided on line 44.

Connected to the remaining input of the AND gate 154 is a GNT_RDY30 signal indicating that a grant of the bus 24 is available. The GNT_RDY signal, represented generally as GNT_RDYPn where P corresponds to the decimal equivalent of the binary representation of the preset priority levels for panic, high, mid and low, and n corresponds to the corresponding I/O port for the circuit 40, serves as a means for ensuring the device 26 or 35–37 with the highest priority is normally granted the bus 24. The manner in which the various GNT_RDYPn signals are generated is discussed more fully below in connection with FIG. 7. In the case of segment S1 corresponding to I/O port 0 (host bridge 26), this segment will always have the highest priority in view of the associated preset priority corresponding to a panic level and by virtue of being associated with the highest priority I/O port. Consequently, the GNT_RDY30 signal provided to the AND gate 154 can be a hardwired or fixed logical "1" signal as will be appreciated.

Thus, the output of the AND gate 154 will go high (logic level "1") only in the event the BUS_BLOCK3(0) signal is not asserted; the host bridge 26 requests the bus 24 via a request on line 44 (logic level "1"); the GNT_RDY30 signal is asserted (logic level "1") indicating the bus 24 is available to the host bridge 26; and the priority level of the host bridge 26 as represented by the PRIORITY0 signal is equal to the priority level on line 151 corresponding to the particular segment. The output on line 158 is input to a 2-input AND gate 160, and the other input of the AND gate 160 is provided by the ARBITRATE signal on line 92 as provided by the state machine 74. If the output on line 158 is asserted by going high, and if the arbiter circuit 40 is in an arbitration state based on the ARBITRATE signal on line 92 going high, the output of the AND gate 160 goes high on line 162. The output on line 162 represents a segment grant signal GNT30 of the general format GNTPn, where P corresponds to the decimal equivalent of the binary representation of the preset priority levels for panic, high, mid and low, and n corresponds to the corresponding I/O port for the circuit 40.

Referring again to the AND gate 156, in addition to the output of the comparator 150 the AND gate 156 also receives at an inverted input the GNT_RDY30 signal. Moreover, the AND gate 156 receives at the remaining input the bus request signal REQ0 on line 44. Accordingly, in the event the host bridge 26 requests the bus 24 and hence the REQ0 signal is high, and the output of the comparator 150 is high indicating that the priority of the host bridge 26 matches the priority level of segment S1, this indicates that the host bridge 26 would like access to the bus 24 and that there is correspondence among the respective priority levels. However, if the GNT_RDY30 signal is not high thereby indicating that the bus arbiter circuit 40 is not willing to grant access of the bus 24 to the host bridge 26, the output of the AND gate 156 will be high on line 166. Such output on line 166 is input to an AND gate 168 together with the ARBITRATE signal on line 92. If the output of the AND gate 156 is high when the ARBITRATE signal on line 92 is high during an arbitration cycle, the output of the AND gate 168 on line 170 will go high. The output on line 170 serves as a segment INC_DENY30 signal of the general format INC_DENYPn, where P corresponds to the decimal equivalent of the binary representation of the preset priority levels for panic, high, mid and low, and n corresponds to the corresponding I/O port for the circuit 40. The segment INC_DENY Pn signals serve to increment the deny counter 114 (FIG. 3) when a device requesting the bus 24 is not granted the bus as is described more fully in connection with FIG. 6 below.

The remaining segments represented in FIG. 4 have the exact same logic configuration as segment S1 associated with the host bridge 26, and corresponding elements are represented by corresponding reference numerals. The only differences are the particular inputs and outputs as will be appreciated. For example, segment S3 corresponding to device 37 connected to the Nth I/O port receives as inputs the request signal REQN, the GNT_RDY1N signal, the PRIORITYN signal, the priority value "01" and BUS_BLOCK1(N) signal. The outputs are GNT1N and INC_DENY1N. In this segment, P=1, which corresponds to the preset priority level of "01", and n=N corresponding to the Nth device I/O port.

Figure 5:
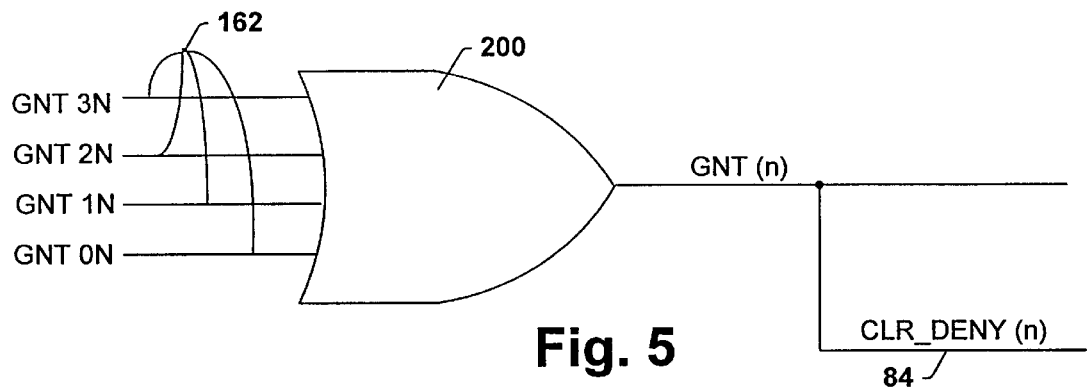
FIG. 5 is a logic diagram of a circuit within the selector and bus block section of the bus arbiter circuit for combining a plurality of intermediate bus grant signals for a given device into a bus grant signal for the device in accordance with the present invention.

FIG. 5 illustrates the manner in which the selector and bus block circuit 72 combines the segment grant signals GNT0n to GNT3n for each I/O port n. Specifically, each of the segment grant signals GNT0n to GNT3n from segments S1–S4 for a nth I/O port are ORed together by an OR gate 200 to generate an overall bus grant signal GNT(n) provided to the corresponding device via lines 54–57. Thus, if any one of the segment grant signals GNT0n to GNT3n goes high, the bus grant signal GNT(n) will be asserted. Since the bus grant signal GNT(n) indicates that the device associated therewith is being granted access to the bus 24, the output of the OR gate 200 also serves to generate the CLR_DENY(n) signal on line 84 for the corresponding device. In this manner, the deny counter 114 is reset to zero for the device 26 or 35–37 which has just been granted access to the bus 24.

Figure 6:
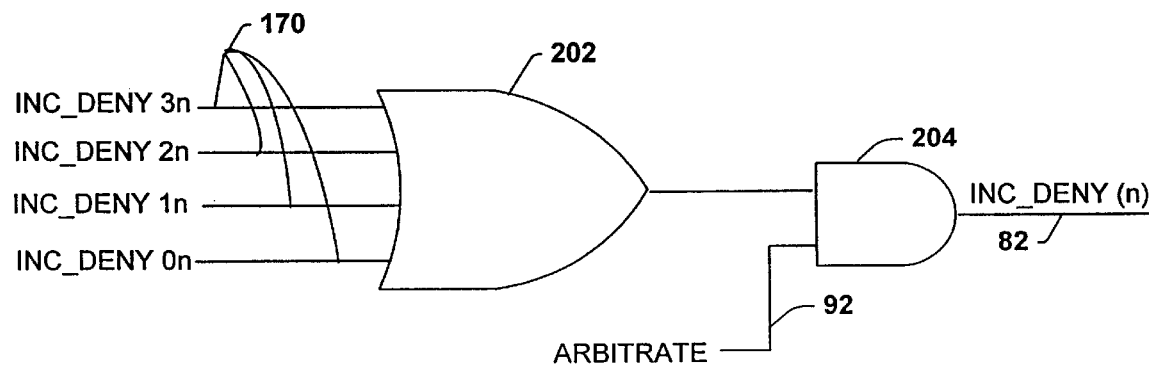
FIG. 6 is a logic diagram of a circuit within the selector and bus block section of the bus arbiter circuit for combining a plurality of intermediate increment deny signals for a given device into an overall increment deny signal for the device in accordance with the present invention.

FIG. 6 illustrates the logic circuitry for combining the segment increment deny signals (INC_DENY0n to INC_DENY3n) for each device I/O port n. Specifically, each of the segment INC_DENY signals (INC_DENY0n to INC_DENY3n) from segments S1–S4 for a nth I/O port are ORed together by an OR gate 202. The output of the OR gate 202 is input to an AND gate 204 together with the ARBITRATE signal on line 92 to generate an overall increment deny signal INC_DENY(n) provided to the priority level override circuit 70 for the corresponding device on line 82. Thus, if any one of the segment increment deny signals (INC_DENY0n to INC_DENY3n) goes high when the ARBITRATE signal on line 92 is asserted the INC_DENY(n) signal on line 82 will be asserted so as to increment the corresponding deny counter 114 (FIG. 3). In this manner, if a device is repeatedly passed over with respect to being granted access to the bus 24, its corresponding deny counter 114 is incremented each time. Upon the value of the deny counter equaling the value stored in the deny register 106, the device is automatically upgraded to a "panic" priority level regardless of the original priority level of the device.

Figure 7:
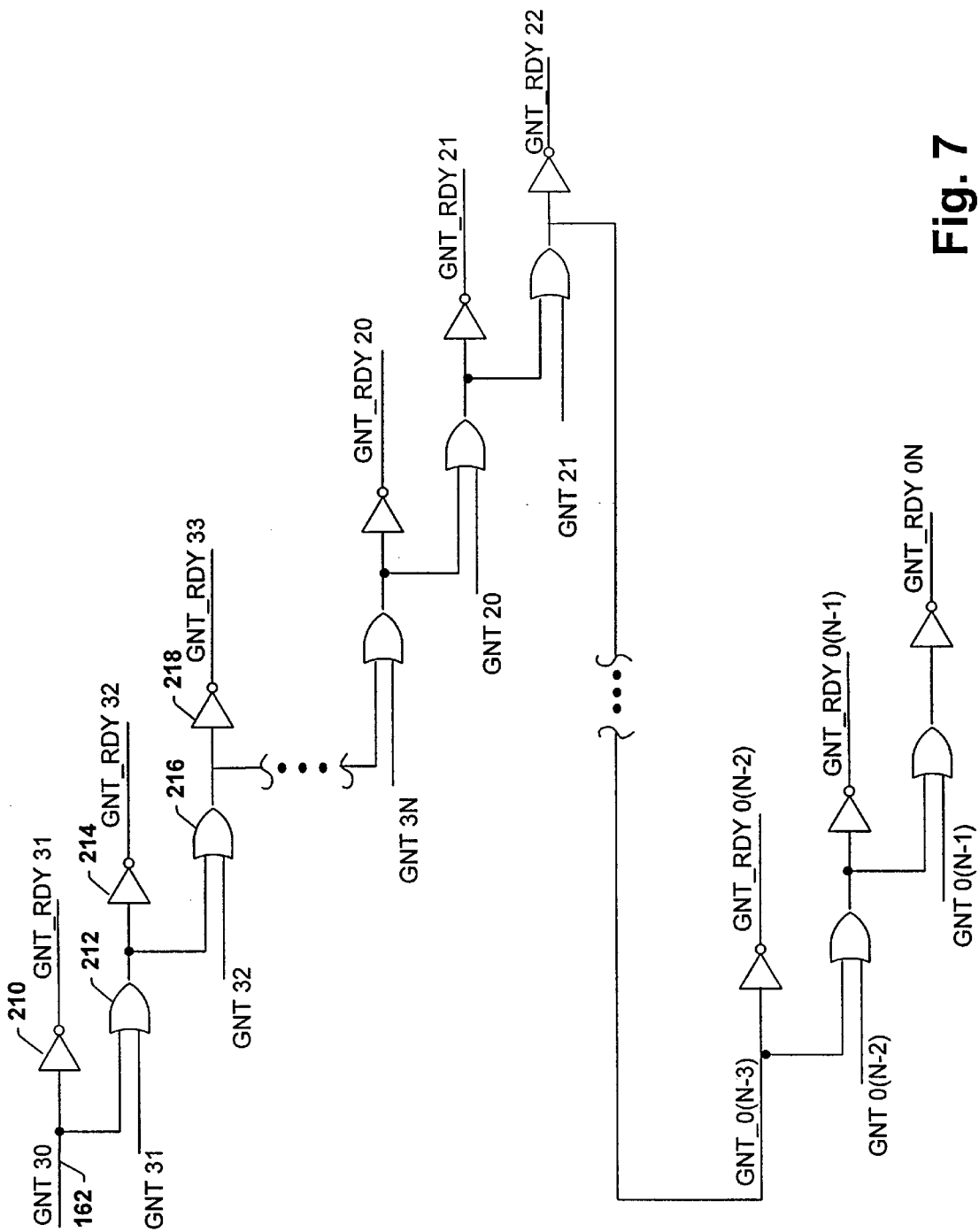
FIG. 7 is a logic diagram of a circuit within the selector and bus block section of the bus arbiter circuit for producing grant ready signals in accordance with the present invention.

Referring now to FIG. 7, the logic circuitry within the selector and bus block circuit 72 is shown for generating the appropriate GNT_RDYPn signals for use in the circuit shown in FIG. 4. As mentioned above, the devices 26 and 35–37 have a preset priority based on the priority level (e.g., panic, high, mid and low) as represented in the respective priority registers 100. In addition, the devices 26 and 35–37 have a preset priority based on the particular I/O port to which it is connected in the bus arbiter circuit 40. The circuit in FIG. 7 takes such priority into account based on a cascaded logic design which propagates through until the device having the highest overall priority is ascertained. Although FIG. 7 only shows a portion of the circuit, it will be appreciated that each leg is simply repeated using the next set of GNTPn and GNT_RDYPn signals in the sequence.

Since a device connected to the 0th I/O port and having a panic level priority will always have the highest priority, the sequence begins with the GNT30 signal from line 162 of the corresponding segment S1 being input to an inverter 210. The output of the inverter 210 represents the GNT_RDY31 signal. If the GNT30 signal is asserted high indicating the corresponding device 26 desires the bus, the GNT_RDY31 signal will be low so as to prevent a segment bus grant signal GNT31 from being issued for a device associated with the 1st I/O port yet having a panic priority level. The GNT30 is also ORed together with the GNT31 signal by OR gate 212. The output of the OR gate 212 is inverted by an invertor 214 to produce the GNT_RDY32 signal. In addition, the output of the OR gate 212 is ORed together with the GNT32 signal by OR gate 216. The output of the OR gate 216 is inverted by invertor 218 to produce the GNT_RDY33 signal. This logical ORing of the segment grant signals GNTPn and the inversion of the ORed product to produce the respective GNT_RDYPn signals is repeated in sequence from GNT30–GNT3N to GNT20–GNT2N, to GNT10–GNT1N, and to GNT00–GNT0N as represented in FIG. 7. In this manner, a GNT_RDYPn signal is generated only for the device exhibiting the highest priority and requesting the bus 24.

Figure 8:
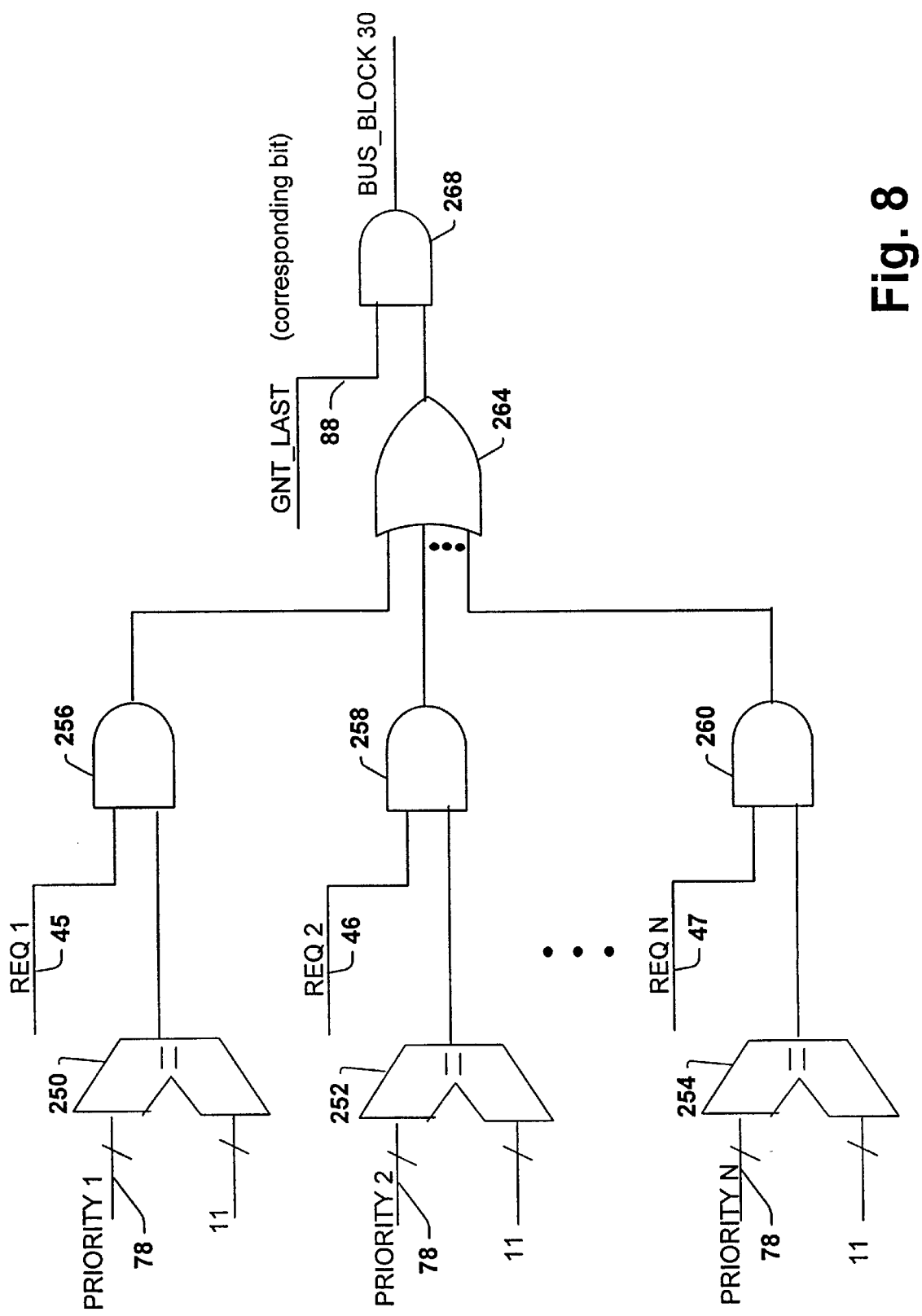
FIG. 8 is a logic diagram of a circuit within the selector and bus block section of the bus arbiter circuit for producing an exemplary bus block signal in accordance with the present invention.

FIG. 8 represents exemplary circuitry for generating the BUS_BLOCK30 signal in the selector and bus block circuit 72. Generally speaking, for each combination request signal and priority, a BUS_BLOCKPn signal is generated to prevent any given device 26 and 35–37 at the same priority level from acquiring the bus 24 in successive arbitration cycles. The generation of each BUS_BLOCKPn signal is done by ANDing the bit in the last grant register 76 corresponding to the grant line GNT(n) with the ORed value of each of the other bus request signals for the other devices. If there are any other devices with requests pending with the same priority as the device which would ordinarily be granted access to the bus 24, but which was granted access in the previous arbitration cycle, the device is blocked from arbitration in the current arbitration cycle by the BUS_BLOCKPn signal.

FIG. 8 shows the logic circuit for generating the BUS_BLOCK30 signal (priority level "11", 0th I/O port), although it will be appreciated that the various other BUS_BLOCKPn signals can be generated in a similar manner. The PRIORITYn signals for those devices 35–37 other than the device at issue (e.g., the host bridge 26) are input into respective comparators 250, 252 and 254. The other input to each of the comparators is a hardwired or otherwise fixed "11" value. In this manner, the output of the comparators 250, 252 and 254 will go high only if one of the other devices 35–37 currently has a priority level of "11". The output from each of the comparators is coupled to an input of a corresponding AND gate 256, 258 and 260. Coupled to the remaining input of the AND gates 256, 258 and 260 are the bus request signals REQ1, REQ2 and REQN, respectively. Accordingly, the outputs of any one of the AND gates 256, 258 and 260 will go high only if another device (e.g., 35–37) having the same priority level (e.g., "11") is currently requesting the bus 24.

The outputs of the AND gates 256, 258 and 260 are ORed together by an OR gate 264. The output of the OR gate 264 will thus go high if another device having the same priority is requesting the bus 24. The output of the OR gate 264 is input to an AND gate 268. The other input of the AND gate 268 is provided by the bit from the last grant register 76 on line 88 corresponding to the device at issue (e.g., the host bridge 26). If the host bridge 26 had been granted the bus 24 in the previous arbitration cycle, the value from line 54 (FIG. 1) as stored in the last grant register would be a logic "1". The bit is then provided to the AND gate 268 during the current arbitration cycle. If the corresponding bit is a logic "1" indicating that the host bridge 26 previously had the bus 24 and the output of the OR gate 264 is a logic "1" to indicate another device of the same priority level is requesting the bus 24, the output of the AND gate 268 goes high to provide the BUS_BLOCK30 signal. This prevents the host bridge 26 from again being granted the bus 24 by virtue of the AND gate 154 in FIG. 4. The remaining BUS_BLOCKPn signals are generated in like manner for the different panic, high, mid and low priority levels and the different devices. Hence further detail is omitted for sake of brevity.

Figure 9:
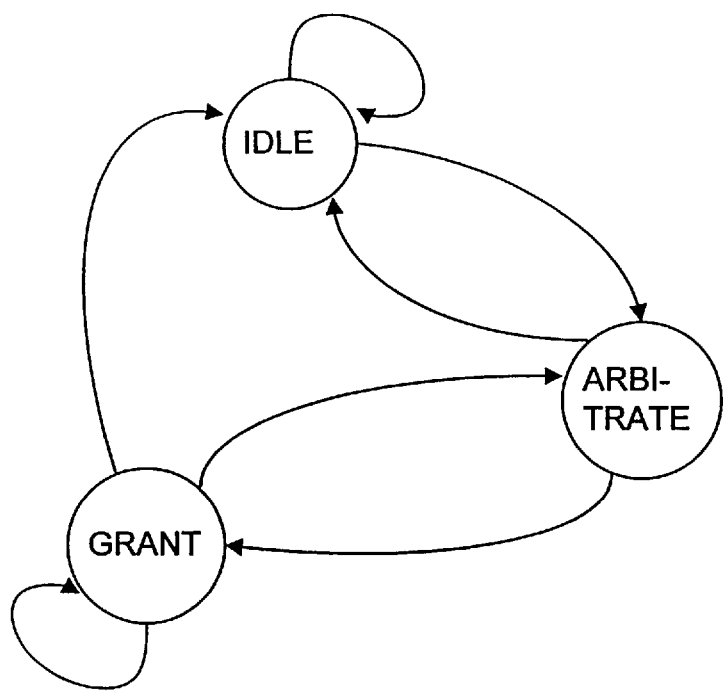
FIG. 9 is a state diagram representing the operation of the state machine included in the bus arbiter in accordance with the present invention.

FIG. 9 is a state diagram representing the operation of the state machine 74 of FIG. 2. The state machine 74 includes three states: IDLE, ARBITRATE AND GRANT. The IDLE state indicates that no device is controlling the bus, and there are no requests via lines 44–47 pending. From the IDLE state, the state machine 74 may: 1) remain in the IDLE state, if the system is reset via a reset input 280 (FIG. 2), or for as long as none of the request signals on lines 44–47 are asserted; and 2) go to the ARBITRATE state whenever any bus request signal on lines 44–47 transitions to an asserted state.

The ARBITRATE state indicates that the bus arbiter circuit 40 is selecting a device to which to grant the bus 24. From the ARBITRATE state, the state machine 74 may: 1) go to the GRANT state if any bus request on lines 44–47 remains asserted; and 2) go the IDLE state if all requests on the bus request lines 44–47 are removed while in the ARBITRATE state. The GRANT state indicates that the bus arbiter circuit 40 has selected a device 26 or 35–37 to which to grant the bus 24, and has indicated the grant via lines 54–57 to the selected device. From the GRANT state, the state machine 74 may: 1) go to the IDLE state when all bus requests on lines 44–47 are removed, or the system is reset via line 280; 2) go to the ARBITRATE state when the request for the currently granted bus 24 is removed and other requests on lines 44–47 are asserted; and 3) remain in the GRANT state for as long as the current granted request remains asserted on lines 44–47.

The state machine 74 is configured to assert the ARBITRATE signal on line 92 and the MSTR_INC signal on line 80 while in the ARBITRATE state. The state machine 74 is configured to assert the control signal on line 90 to the last grant register 76 when transitioning from the ARBITRATE state to the GRANT state. Thus, the last grant register 76 always stores the identity of the device which was granted the bus 24 in the previous arbitration cycle. The state machine 74 also is responsible for providing the host ready inquiry on line 60 in response to a bus request signal on lines 44–47, and for receiving the host response signal on line 62 for determining when the state machine 74 can transition from the ARBITRATE state to the GRANT state as will be appreciated.

Figure 10:
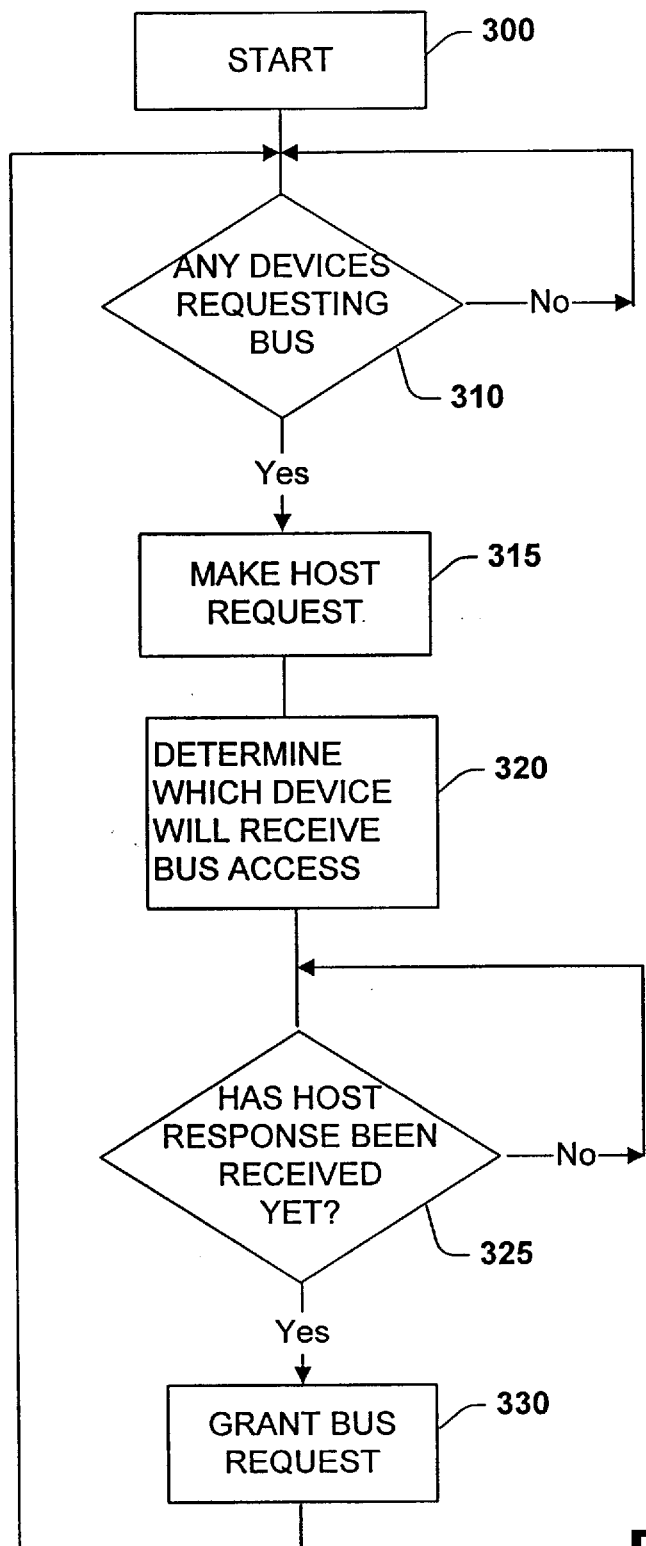
FIG. 10 is a flowchart representing the operation of the bus arbiter in accordance with the present invention.

Referring to FIG. 10, the general operation of the bus arbiter circuit 40 is described by way of a flowchart. In step 300, the bus arbiter circuit 40 goes through an initialization stage in which the bus arbiter circuit 40 readies itself for bus requests. The bus arbiter circuit 40 then goes to step 310 where it waits for at least one device to request bus access. If no devices are requesting the bus, the bus arbiter circuit 40 returns to step 310 and continually monitors for any such request. If one or more requests are made or are pending, the bus arbiter circuit 40 goes to step 315 where the bus arbiter circuit 40 makes a host request via line 60 to determine whether the host processor 22 is ready to receive new communications. Following the host request, the bus arbiter circuit 40 proceeds to step 320 where it determines which of the devices requesting the bus will be the next to receive access. This is done in accordance with the procedures outlined above. After the bus arbiter circuit 40 has selected the next device to be granted bus access, the bus arbiter circuit 40 proceeds to step 325 where it determines if a host ready signal has been received yet via line 62 indicating that the host is ready to receive new communications. If the host response has not been received, the bus arbiter circuit 40 waits in step 325 before proceeding. If a host response is received, which indicates the host processor 22 is again available, the bus arbiter circuit 40 proceeds to step 330 where it grants the selected device access to the bus 24.

Accordingly, it will be appreciated that the present invention provides a bus arbiter and method in which a device requesting access to the bus may be reprioritized each time such a device is denied access or is otherwise passed over in favor of another device. Consequently, a device which is repeatedly denied access to the bus will have its priority level automatically upgraded in order that the device will eventually be granted access to the bus. At the same time, however, the priority level of the device does not fall below a preset priority level.

Figure 11:
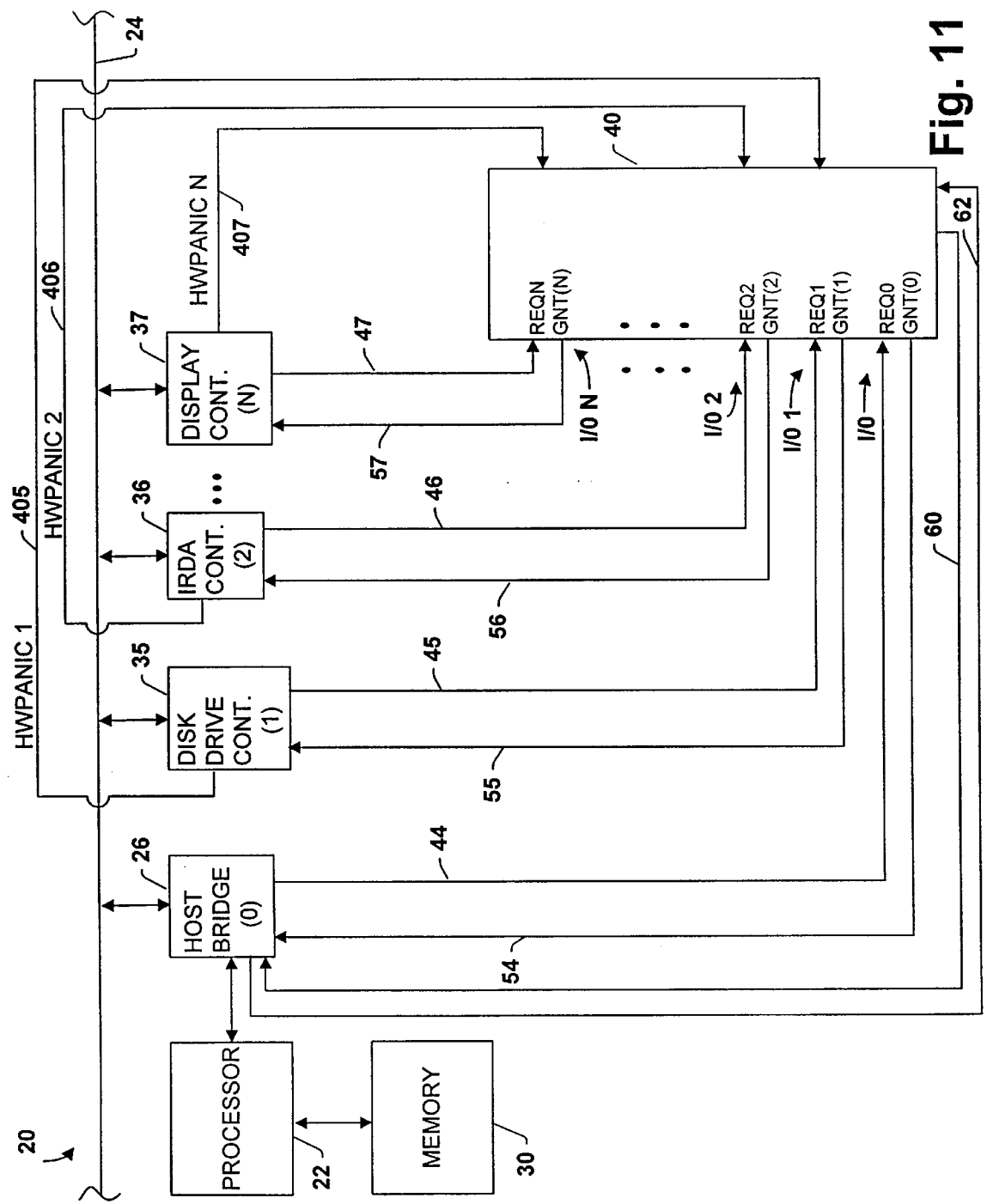
FIG. 11 is a block diagram of a computer system and bus arbiter circuit in accordance with another embodiment of the invention.

Referring briefly to FIG. 11, another embodiment of a computer system 20 with a bus arbitration circuit 40 is shown. In addition to a panic condition being declared by the bus arbitration circuit 40 in the event that a device continues not to receive the bus 24 as in the embodiment of FIG. 1, it may also be desirable to allow the peripheral devices 35–37 themselves to declare a panic condition to the bus arbitration circuit 40. For example, the devices 35–37 can be configured to assert a hardware panic signal to the bus arbiter circuit 40 in "panic" situations as determined by the devices themselves. Provided the bus arbiter circuit 40 is configured to allow the device to assert a hardware panic signal, the priority level of a device asserting a hardware panic signal will automatically be upgraded to a "panic" level.

Accordingly, in the embodiment of FIG. 11 each peripheral device 35–37 optionally may supply a hardware panic (HWPANIC) signal to the bus arbiter circuit 40. For example, device 35 provides a HWPANIC1 signal to the bus arbiter circuit 40 on line 405. Similarly, devices 36 and 37 provide signals HWPANIC2 and HWPANICN to the bus arbiter circuit 40 via lines 406 and 407, respectively. When a device 35–37 wishes to declare a panic condition, the device 35–37 asserts a logic "1" onto its corresponding HWPANIC signal line. Such signal is received by the bus arbiter circuit 40 and is processed in the priority override circuit for the corresponding device.

Figure 12:
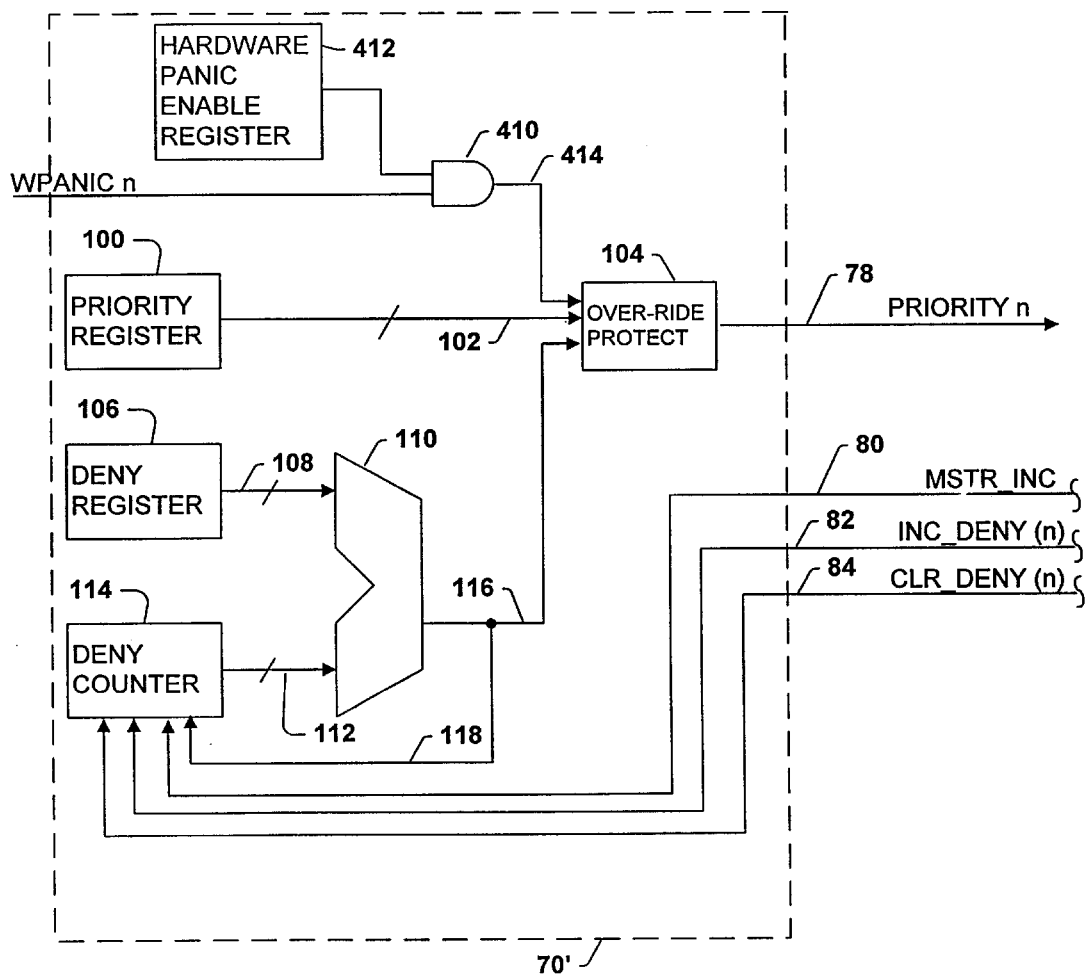
FIG. 12 is a detailed block diagram of a priority level override circuit in accordance with the embodiment of FIG. 11.

More specifically, FIG. 12 illustrates the priority override circuit 70' in the bus arbiter circuit 40 for each of the devices 35–37 according to the embodiment of FIG. 11. The construction and operation of the priority override circuit 70' is identical to that explained above in connection with FIG. 3 except as discussed herein. As shown in FIG. 12, the HWPANIC signal from the respective device 35–37 is input to an AND gate 410 included in the priority override circuit 70'. The AND gate 410 is used to selectively enable the hardware panic feature of the corresponding device by ANDing the HWPANIC signal with the output of a one-bit hardware panic enable register 412 also included in the priority override circuit 70'. The value of the bit stored in the register 412 is controlled by software, for example, during a bootup routine executed in the system 20. Specifically, those devices 35–37 which are to be able to assert a HWPANIC signal are identified as part of a bootup routine and the values of the bits in the registers 412 corresponding to those devices which can assert a HWPANIC signal is set to logic "1". Those devices 35–37 which are not to be capable of asserting a HWPANIC signal have the bits in their corresponding registers 412 set to logic "0".

As a result, if the value in a register 412 is set to "1" so as to enable the HWPANIC signal for the corresponding device, the output of the AND gate 410 on line 414 will go high (i.e., a logic "1") if the device asserts the HWPANIC signal. Line 414 is input to the override protect circuit 104. In this embodiment, the override protect circuit 104 is designed to output a "panic" priority level of "11" on line 78 also in the case where the gated HWPANIC signal on line 414 goes high. Accordingly, by asserting a "1" on its corresponding HWPANIC signal line to indicate a hardware panic condition, a device 35–37 can override the default or programmed value of the priority register. It is noted that the devices 35–37 should be configured as a default to reset or power-up with its HWPANIC signal deasserted. Additionally, if the device 35–37 asserts its HWPANIC signal, it must configured to deassert its HWPANIC signal once the bus 24 has been granted to it by the bus arbiter circuit 40.

Although the invention has been shown and described with respect to certain preferred embodiments, it is obvious that equivalents and modifications will occur to others skilled in the art upon the reading and understanding of the specification. For example, the invention is described in the context of four discrete levels of preset priority, e.g., panic, high, mid and low. It will be appreciated, however, that another number of levels could also be used. Moreover, the priority of a respective device is described as remaining fixed at a preset level until such case as the priority is upgraded or overridden to the highest level. It will be appreciated that the priority of a device may instead be upgraded in multiple steps in relationship to the contents of the corresponding deny counter 114. Additionally, the preferred embodiment of the invention utilizes a hardware approach using various combination logic in the form of a programmable logic array (PLA) or the like. Alternatively, the invention may be carried out primarily via software as will be appreciated.

Furthermore, in another embodiment the peripheral devices 35–37 could be preprogrammed to keep count themselves the number of times the device requested access to the bus and did not receive the bus. If the count reaches a predefined level equivalent to that stored in the deny counter, the device can assert a HWPANIC signal in the manner described in the embodiment of FIG. 11. Thus, it would not be necessary to include a deny counter, deny register, etc. in the priority override circuit in such an embodiment.

The present invention includes all such equivalents and modifications, and is limited only by the scope of the following claims.

What is claimed is:

1. A bus arbiter circuit for a system including a bus and a plurality of devices which can request access to the bus at various times, each of the devices being configured to provide a bus request signal to the bus arbiter circuit when requesting access to the bus and to receive a bus grant signal from the bus arbiter circuit when granted access to the bus, the bus arbiter circuit comprising:

circuitry for arbitrating access to the bus during an arbitration cycle in response to bus request signals from those of the plurality of devices requesting access, an outcome of the arbitration cycle being based on a corresponding priority level associated with each of the plurality of devices;

circuitry for granting access, via a respective bus grant signal, to one of those devices requesting access to the bus based on the outcome of the arbitration cycle;

circuitry for increasing the corresponding priority level associated with those of the plurality of devices which requested access to the bus but which were not granted access to the bus as a result of the arbitration cycle; and circuitry for increasing the corresponding priority level of at least one of the plurality of devices above the priority level which would normally be assigned if the at least one of the plurality of devices requesting access to the bus was not granted access in response to receiving a hardware panic signal from the at least one of the plurality of devices indicative of the at least one of the plurality of devices desiring increased priority above the priority level which would normally be assigned.

2. The circuit of claim 1, wherein the priority levels of those of the plurality of devices which did not request access to the bus during the arbitration cycle are not increased in response to access to the bus being granted to another of the plurality of devices.

3. The circuit of claim 1, wherein the circuitry for increasing the corresponding priority level includes a priority level override circuit for each of the plurality of devices, the priority level override circuit including a priority register for storing a preset priority level associated with the corresponding device, and a circuit for overriding the preset priority level with a higher priority level as a result of at least one of the corresponding device having requested access to the bus but not having been granted access to the bus through at least one arbitration cycle and the corresponding device having asserted a hardware panic signal.

4. The circuit of claim 3, wherein each priority level override circuit further includes a deny register for storing an indication of a number of times the corresponding device can request access to the bus and not receive access to the bus before the priority level of the corresponding device is increased from the preset priority level.

5. The circuit of claim 4, wherein each priority level override circuit further includes a deny counter which maintains a count of the number of times the corresponding device has requested access to the bus and not received access to the bus since a previous time the corresponding device had access to the bus, and a comparator for comparing the contents of the deny register and the deny counter in order to output a signal for increasing the priority level of the corresponding device.

6. The circuit of claim 5, wherein the deny counter is incremented each time the corresponding device requests access to the bus but is not granted access to the bus.

7. The circuit of claim 6, wherein the deny counter is reset upon the corresponding device being granted access to the bus.

8. The circuit of claim 1, wherein the bus is a PCI bus.

9. The circuit of claim 1, wherein the circuit includes a state machine for controlling operation thereof.

10. A bus arbiter circuit for a system including a bus and a plurality of devices which can request access to the bus at various times, the bus arbiter circuit comprising:

circuitry for receiving requests for access to the bus from those of the plurality of devices desiring access to the bus during an arbitration cycle;

circuitry for arbitrating access to the bus during the arbitration cycle in response to the received requests, an outcome of the arbitration cycle being based on a corresponding priority level associated with each of the plurality of devices;

circuitry for granting access to one of those devices requesting access to the bus based on the outcome of the arbitration cycle;

circuitry for increasing the corresponding priority level associated with those of the plurality of devices which requested access to the bus but which were not granted access to the bus as a result of the arbitration cycle; and circuitry for increasing the corresponding priority level of at least one of the plurality of devices above the priority level which would normally be assigned if the at least one of the plurality of devices requesting access to the bus was not granted access in response to receiving a hardware panic signal from the at least one of the plurality of devices indicative of the at least one of the plurality of devices desiring increased priority above the priority level which would normally be assigned.

11. The circuit of claim 10, wherein the priority levels of those of the plurality of devices which did not request access to the bus during the arbitration cycle are not increased in response to access to the bus being granted to another of the plurality of devices.

12. The circuit of claim 10, wherein the circuitry for increasing the corresponding priority level includes a priority level override circuit for each of the plurality of devices, the priority level override circuit including a priority register for storing a preset priority level associated with the corresponding device, and a circuit for overriding the preset priority level with a higher priority level as a result of at least one of the corresponding device having requested access to the bus but not having been granted access to the bus through at least one arbitration cycle and the corresponding device having asserted a hardware panic signal.

13. The circuit of claim 10, wherein the bus is a PCI bus.

14. The circuit of claim 10, wherein the circuit includes a state machine for controlling operation thereof.

15. A method of bus arbitration in a system including a bus and a plurality of devices which can request access to the bus at various times, the method comprising the steps of:

receiving requests for access to the bus from those of the plurality of devices desiring access to the bus during an arbitration cycle;

arbitrating access to the bus during the arbitration cycle in response to the received requests, an outcome of the arbitration cycle being based on a corresponding priority level associated with each of the plurality of devices;

granting access to one of those devices requesting access to the bus based on the outcome of the arbitration cycle;

increasing the corresponding priority level associated with those of the plurality of devices which requested access to the bus but which were not granted access to the bus as a result of the arbitration cycle; and increasing the corresponding priority level associated with at least one of the plurality of devices above the priority level which would normally be assigned if the at least one of the plurality of devices requesting access to the bus was not granted access in response to receiving a hardware panic signal from the at least one of the plurality of devices indicative of the at least one of the plurality of devices desiring increased priority above the priority level which would normally be assigned.

16. The method of claim 15, wherein the priority levels of those of the plurality of devices which did not request access to the bus during the arbitration cycle are not increased in response to access to the bus being granted to another of the plurality of devices.

17. The method of claim 15, wherein the step of increasing the corresponding priority level includes using a priority level override circuit for each of the plurality of devices, the priority level override circuit including a priority register for storing a preset priority level associated with the corresponding device, and a circuit for overriding the preset priority level with a higher priority level as a result of at least one of the corresponding device having requested access to the bus but not having been granted access to the bus through at least one arbitration cycle and the corresponding device having asserted a hardware panic signal.

18. A bus arbiter circuit for a system including a bus and a plurality of devices which can request access to the bus at various times, each of the devices being configured to provide a bus request signal to the bus arbiter circuit when requesting access to the bus and to receive a bus grant signal from the bus arbiter circuit when granted access to the bus, and at least one of the devices being configured to provide a hardware panic signal to the bus arbiter circuit indicative of the at least one device desiring increased priority, the bus arbiter circuit comprising:

circuitry for arbitrating access to the bus during an arbitration cycle in response to bus request signals from those of the plurality of devices requesting access, an outcome of the arbitration cycle being based on a corresponding priority level associated with each of the plurality of devices;

circuitry for granting access, via a respective bus grant signal, to one of those devices requesting access to the bus based on the outcome of the arbitration cycle; and circuitry for increasing the corresponding priority level associated with the at least one device above the priority level which would normally be assigned if the at least one device requesting access to the bus was not granted access in response to receiving the hardware panic signal from the at least one device indicative of the at least one device desiring increased priority above the priority level which would normally be assigned.

19. A method of bus arbitration in a system including a bus and a plurality of devices which can request access to the bus at various times, the method comprising the steps of:

receiving requests for access to the bus from those of the plurality of devices desiring access to the bus during an arbitration cycle;

arbitrating access to the bus during the arbitration cycle in response to the received requests, an outcome of the arbitration cycle being based on a corresponding priority level associated with each of the plurality of devices;

increasing the corresponding priority level associated with at least one of the plurality of devices above the priority level which would normally be assigned if the at least one of the plurality of devices requesting access to the bus was not granted access in response to receiving a hardware panic signal from the at least one of the plurality of devices indicative of the at least one of the plurality of devices desiring increased priority above the priority level which would normally be assigned; and granting access to one of those devices requesting access to the bus based on the outcome of the arbitration cycle.

20. The method of claim 19, further including the step of increasing the corresponding priority level associated with those of the plurality of devices which requested access to the bus but which were not granted access to the bus as a result of the arbitration cycle.

* * * * *